April 16, 1935.    D. K. BLAKE    1,998,304
ELECTRICAL DISTRIBUTION SYSTEM
Filed Aug. 16, 1932
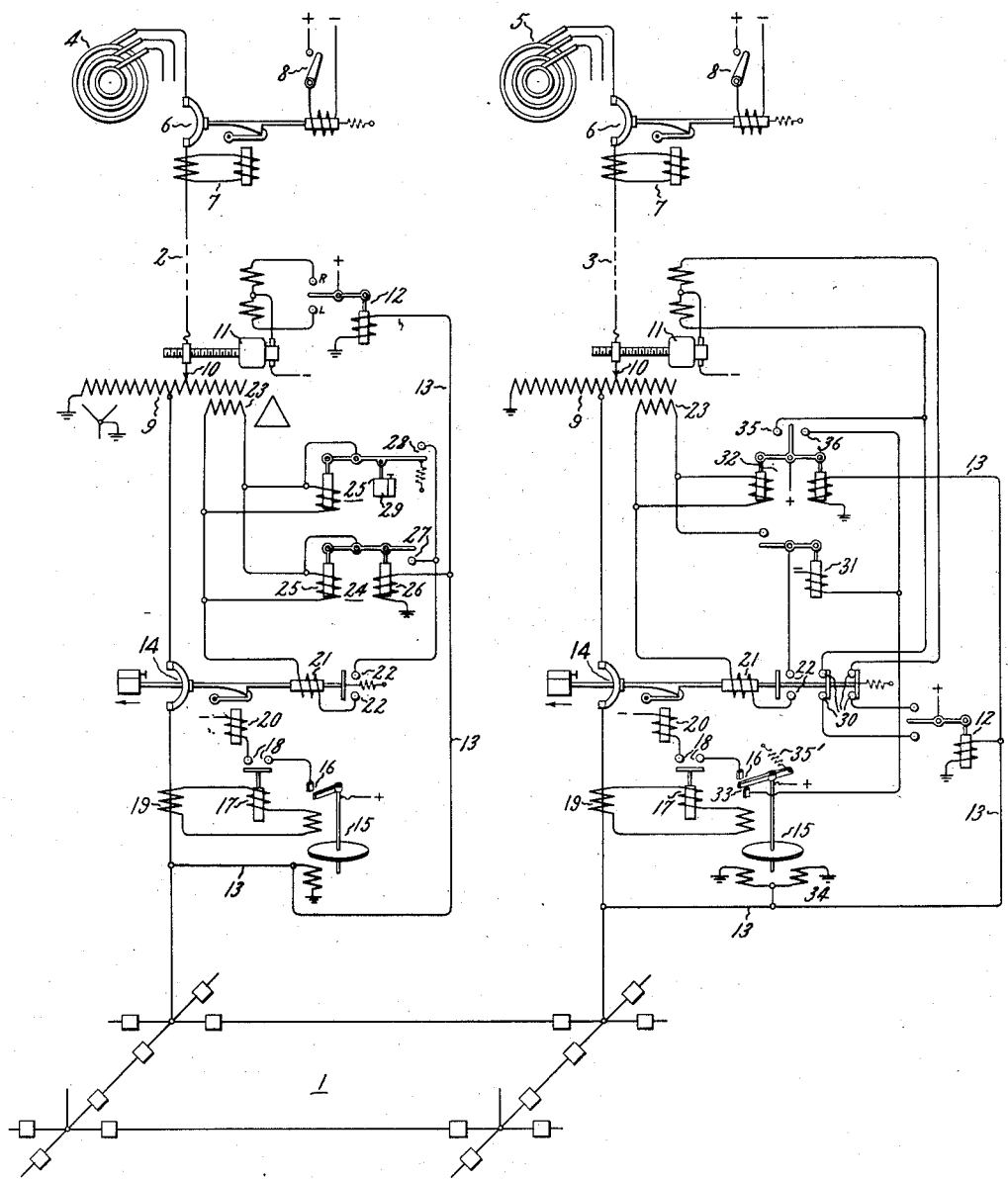
Inventor:
David K. Blake,
by Charles E. Tullar
His Attorney.

Patented Apr. 16, 1935

1,998,304

UNITED STATES PATENT OFFICE 1,998,304

ELECTRICAL DISTRIBUTION SYSTEM

David K. Blake, Scotia, N. Y., assignor to General Electric Company, a corporation of New York Application August 16, 1932, Serial No. 628,991

6 Claims. (Cl. 171—118)

My invention relates to electrical distribution systems and more particularly to alternating current network-type distribution systems.

Network-type distribution systems usually include a network of interconnected conductors which is energized by a plurality of feeder circuits. The feeder circuits may or may not be energized from the same bus or generator.

In order to insure a high degree of voltage constancy throughout the network regardless of unsymmetrical or variable loading, voltage regulating means are associated with the feeder circuits so as to permit voltage control at the interconnection points of the network and feeder circuits. These voltage regulating means are usually relatively slow acting.

To facilitate control of network systems, it is customary to provide means at the source ends of the feeder circuits for controlling the connection of these circuits to the network. Control is thus facilitated because the source ends of the feeders are usually centralized in one or more groups, whereas their load ends are widely scattered among the network interconnection points.

Due to the above method of control and to the time characteristics of the voltage regulating means, it will sometimes happen that a feeder circuit will be connected to the network at a time when the voltage of this circuit is considerably higher than the network voltage. This will cause objectionable current and voltage fluctuations.

In accordance with my invention, I provide simple and novel arrangements for minimizing or obviating the above operating difficulty.

It is an object of my invention to provide a new and improved distribution system.

Another object of my invention is to provide new and improved means for controlling the connection of network feeder circuits to distribution networks.

A further object of my invention is to provide an improved coordinated arrangement between the means for connecting network feeder circuits to distribution networks and the voltage regulating means of the feeder circuits.

My invention will be better understood from the following description taken in connection with the accompanying drawing and its scope will be pointed out in the appended claims.

Referring now to the single figure in the accompanying drawing, which illustrates diagrammatically an embodiment of my invention, it will be seen that I have shown my invention as applied to a primary network distribution system consisting of a primary distribution network 1, which is energized by feeder circuits 2 and 3, which in turn are energized respectively by generators 4 and 5. By primary network system, I mean a system in which the network voltage is too high to adapt it for direct connection to ultimate energy consuming load devices. It gets its name from the fact that the network includes the primary windings of the usual pole type distribution transformers whose secondary windings are often interconnected to form a so-called secondary distribution network. Primary network distribution systems are usually polyphase systems and generators 4 and 5 are shown as three phase alternating current generators. For the sake of simplicity, however, I have shown the network feeder circuits as single phase circuits as the principle of operation of my invention is the same regardless of the number of phases employed.

For controlling the connections of the source ends of the feeder circuits to their respective generators, I provide circuit breakers 6 which are provided with simple overload responsive tripping means 7, and manually controlled reclosing means 8.

Connected in each of the feeder circuits is a voltage step-down transformer 9 for reducing the voltage from the transmission voltage of the feeder circuit to the network voltage.

Any suitable way of regulating the voltage of the feeder circuits may be employed, and one simple method is to provide the transformers 9 with automatic ratio adjusting means. As shown, this means consists of a tap changing contact 10, which is operated by means of a reversible pilot motor 11, whose direction of operation is controlled by a voltage responsive device, such as a contact making voltmeter 12, connected through a circuit 13 to be responsive to the network voltage. The arrangement is such that when the network voltage is high the contact making voltmeter 12 will be unbalanced and its core will be moved upwardly as viewed in the drawing, thereby causing engagement of its arm with the lowermost contact whereby an operating circuit for motor 11 is completed and motor 11 operates in such a direction as to cause its tap changing contact 10 to increase the number of turns of the primary winding of the transformer. Similarly, if the voltage of the network is low, the contact making voltmeter causes engagement with its other contact, thereby reversing the operation of the motor and causing the tap changing contact 10 to move in the opposite direction and increase the secondary voltage of the transformer.

For controlling the connection of the load end of feeder circuit 2 to the network, I provide a circuit breaker 14 which is provided with reverse power overload tripping means. This tripping means consists of a wattmeter type relay 15 connected to be responsive to the voltage and current of feeder circuit 2, and arranged to close its contacts 16 when reverse power flows through circuit 2, that is to say, when power flows from the network into the feeder. The overload element of the tripping means consists of a current relay 17 which closes a set of contacts 18 which are in series with contacts 16 when the current in circuit 2 exceeds a predetermined value. Both current relay 17 and the current element of wattmeter relay 15 are preferably connected to be responsive to the current in circuit 2 by means of a current transformer 19. The circuit including the contacts 16 and 18 controls a tripping coil 20 for circuit breaker 14. The purpose of the reverse power overload tripping means is to disconnect the load end of the feeder circuit from the network at times when there is a fault, such as a ground or short circuit, on the feeder. Upon the occurrence of such faults, the overload tripping means 7 of the high voltage, or source, end breakers 6 will trip their respective breakers, but, due to the fact that the network is energized by a plurality of feeders, voltage will be maintained on the network and consequently reverse power will tend to flow from the network into the fault through the feeders. Thus with respect to the feeders, the network is a load having a counter voltage. However, the reverse power overload equipment prevents power from being supplied from the network to a feeder fault.

Circuit breakers 14 are provided with reclosing coils 21 which are in circuit with back contacts 22, which close when the circuit breakers are open so that energization of the circuits for the reclosing coils will reclose the breakers. Current for operating the reclosing coils 21 is supplied by windings 23 which are usually in the form of a tertiary delta winding on the transformer, which itself is usually a Y—Y connected transformer with its neutral grounded.

Reclosing coil 21 of circuit breaker 14 for feeder circuit 2 is controlled by a voltage ratio relay 24 and a voltage responsive time delay acting relay 25'. Relay 24 has a winding 25 connected across the tertiary winding 23 whereby it is energized in accordance with the voltage of transformer 9. Relay 24 has an opposite voltage winding 26 which is connected to conductor 13 so as to be responsive to the network voltage. This relay is shown as of the balance beam type, but any other suitable relay which operates in accordance with the ratio, or difference of two voltages may be employed. This relay is so arranged that when the voltages of the feeder circuit 2 and the network 1 are substantially equal, or if the network voltage is higher than the circuit voltage, the contacts of relay 24 will close thereby completing a circuit for the reclosing winding 21 of the circuit breaker 14 through the back contacts 22 and the winding 25 of the transformer. However, if the ratio of the feeder circuit voltage and the network voltage is above a predetermined value, relay 24 will remain open.

In order to insure that circuit breaker 14 will eventually close, regardless of the voltage ratio, the auxiliary relay 25' is provided. This relay has contacts 28 connected in parallel with the contacts 27 of relay 24 and this relay is also provided with time delay means, such as a dashpot 29. Thus, if relay 24 does not close the circuit breaker 14 in a predetermined time, relay 25 will operate and coil 21 will be energized and circuit breaker 14 closed.

In normal operation, the various elements will be in the positions illustrated in the drawing. However, if a fault occurs on circuit 2, both circuit breakers 6 and 14 will be tripped open, as has already been explained. If now the fault is cleared and the manually controlled means 8 is operated to close circuit breaker 6, voltage will appear across the terminals of the tertiary winding 23. If the ratio of this voltage to the voltage of the network is below a predetermined value, balance relay 24 will operate at once and close contacts 27, thereby permitting circuit breaker 14 to be closed. However, if the voltage ratio is not below this value, contacts 27 will stay open. During this time, the relay 25' will be closing but the time delay action is so adjusted as to permit the voltage regulating means to go through its operating sequence and lower the circuit voltage in case the network voltage is too high. If, however, within a predetermined time, relay 24 does not cause the closure of circuit breaker 14, contacts 28 of relay 25 will close and circuit breaker 14 will be closed regardless of the voltage ratio.

The reclosing means for the circuit breaker 14 associated with feeder circuit 3 is a modification of the previously described arrangement and differs therefrom in several particulars. In the first place, this circuit breaker is provided with additional back contacts 30 which open the control circuits of the contact making voltmeter 12 when the circuit breaker is open, thereby rendering the voltage regulating means insensitive to variations in network voltage. The advantage of this is that while circuit breaker 14 is open variations in network voltage will not cause the voltage regulating means to go through needless operations which will have no effect upon the network voltage, due to the fact that the breaker 14 is open.

In the second place, the energization of relay 21 is controlled directly by means of an intermediate relay 31 which in turn is jointly controlled by a balance relay 32, similar to the balance relay 24, and an auxiliary set of contacts 33 on the reverse power relay 15. This relay is also provided with an auxiliary voltage coil 34 which, by means of an ordinary shading coil, produces a torque which tends to hold the contacts 33 open, and which is exactly balanced by the torque of a spring 35'. Balance relay 32 is made responsive to the voltage of circuit 3 by connecting it across the tertiary winding 23, and also to the voltage of the network 1 by connecting it to the circuit 13. Balance relay 32 has a set of contacts 35 which are closed when the voltage of the feeder circuit is above the voltage of the network by a predetermined amount, and engagement of contacts 35 completes a circuit for operating the motor 11 in a direction to lower the voltage of the feeder circuit. Thus, contacts 35 are in parallel with the lowering contacts of the contact making voltmeter 12. Opposite contacts 36 are provided on balance relay 32 and these contacts engage whenever the ratio of the feeder voltage to the network voltage is below a predetermined amount. The engagement of contacts 36 completes an energizing circuit for relay 31, thereby causing energization of reclosing coil 21 provided the circuit breaker 14 is open.

The operation of the arrangement associated with feeder circuit 3 is as follows: Assume that circuit breaker 14 is open and that it is desired to reclose it. Manual means 8 is operated to reclose circuit breaker 6. This energizes the transformer 9 and if the voltage of the feeder circuit is high with respect to the network voltage, the relay 32 will cause the engagement of contacts 35 thereby causing the voltage regulating equipment to lower the feeder circuit voltage. As soon as the ratio of the feeder voltage to the network voltage is below a predetermined value, balance relay 32 flips over and contacts 36 engage thereby causing relay 31 to energize the reclosing coil 21 and reclose breaker 14.

The purpose of contact 33 on wattmetric relay 15 is to insure immediate reclosure of breaker 14 if the network voltage should fall to a predetermined low value. This is because one of the most important features of network distribution systems is their reliability and continuity of service and it is one of the ideals of such systems to maintain network voltage at all times. Consequently, if for any reason the network voltage should fall to a predetermined low value, say for example fifty per cent of normal, the torque produced by the voltage responsive torque element 34 will not equal the pull of spring 35' and therefore contacts 33 will close, and these contacts, being in parallel with the contacts 36 of the balance relay 32, will cause energization of the relay 31 and a reclosure of breaker 14.

Both circuit breakers 14 are preferably provided with time delay closing means, such as the illustrated dash pots. This is to prevent premature reclosure of circuit breakers 14. Due to the fact that contacts 27 and 36 will be closed when both breakers of their associated circuits are open, breakers 14 will tend to close immediately after the closing of breakers 6, regardless of the voltage difference between the network and the feeders. The time delay means for breakers 14, however, gives the voltage balance relays time to open their contacts, if voltage conditions are such as to make this necessary, before the breakers 14 can reclose.

While I have shown and described particular embodiments of my invention, it will be obvious to those skilled in the art that changes and modifications may be made without departing from my invention, and I therefore aim in the appended claims to cover all such changes and modifications as fall within the spirit and scope of my invention.

What I claim as new and desire to secure by Letters Patent of the United States, is:

1. In combination, a distribution network, a plurality of parallel feeder circuits for normally simultaneously supplying energy to said network, means for regulating the voltage of one of said feeder circuits in response to the voltage of said network, a time delayed closing circuit breaker for connecting said feeder circuit to said network, and means responsive to the voltage of said circuit and to the voltage of said network for causing closure of said circuit breaker when said voltages are substantialy the same.

2. In combination, a distribution network, a plurality of parallel feeder circuits for normally simultaneously supplying energy to said network, a plurality of time delayed closing circuit breakers for connecting said circuits to said network, automatic voltage regulating means for each feeder circuit responsive to the network voltage, and means responsive to the ratios of the circuit voltages to the network voltage for controlling the closing of the respective circuit breakers.

3. In combination, an electrical supply circuit, a load having a counter voltage, circuit controlling means for controlling the connection of said load to said circuit, means responsive to the ratio of the voltage of said circuit to the voltage of said load for preventing said circuit controlling means from connecting said load to said circuit except when said ratio is below a predetermined value, and time delayed acting means for causing said circuit controlling means to connect said load to said circuit a predetermined time after voltage appears on said circuit regardless of the value of said ratio.

4. In combination, a distribution network, a feeder circuit therefor, a voltage step-down transformer in said feeder circuit, means responsive to the voltage of said network for controlling the ratio of said transformer, a circuit breaker connected between said transformer and said network, means responsive to the ratio of the voltage of said circuit to the voltage of said network for causing closure of said circuit breaker if said voltage ratio is below a predetermined value, and time delayed acting means responsive to voltage of said circuit for closing said circuit breaker regardless of the value of said voltage ratio.

5. In combination, a distribution network, a feeder circuit therefor, means for connecting said circuit to said network, means responsive to the ratio of the voltage of said circuit to the voltage of said network for operating said connecting means only when said ratio is below a predetermined value, and additional means for operating said connecting means when the voltage of said network is below a predetermined value regardless of the value of said ratio.

6. In combination, a distribution network, a feeder circuit therefor, a voltage step-down transformer in said circuit, means responsive to the voltage of said network for controlling the ratio of said transformer, a circuit breaker connected between said circuit and said network, means operative in accordance with the opening of said circuit breaker for rendering said transformer ratio controlling means insensitive to the voltage of said network, means responsive to the ratio of the voltage of said circuit and the voltage of said network for causing said transformer ratio control means to lower the voltage of said circuit if said voltage ratio is above a predetermined value and to cause closure of said circuit breaker if said voltage ratio is below a predetermined value, and means responsive to the voltage of said network for causing closure of said circuit breaker if the network voltage is below a predetermined value regardless of the value of said voltage ratio.

DAVID K. BLAKE.